2,988,513
STABILIZED BORON TRICHLORIDE COMPOSITIONS

Herbert C. Brown, 1840 Garden St., West Lafayette, Ind., and Paul A. Tierney, 235 Kingston Drive, Pittsburgh, Pa.
No Drawing. Filed Apr. 25, 1958, Ser. No. 730,815
10 Claims. (Cl. 252—182)

This invention is related to boron trichloride compositions, in particular boron trichloride compositions which are stabilized.

It is recognized in the art that boron trichloride is of considerable utility in many reactions. A basic characteristic of boron trichloride contributing toward its desirability in many chemical uses is its comparative economy compared to other boron halides. Despite its economy and potential use in many reactions, these benefits have not been realized because of inherent disadvantages when employing boron trichloride in certain reactions. An important use of boron trichloride is in its reaction with sodium borohydride or sodium hydride to produce diborane. In the procedures utilized to date, boron trichloride has not been found suitable because of its reactivity in undesirable side reactions. More recently, however, it has been found that the aforementioned benefits of using boron trichloride in these and other reactions can be realized by catalyzing the reactions with certain ethers. These ethers not only promote the reaction by the catalytic effect but they also have a greater solubility for the sodium borohydride and boron trichloride. This new development, although encouraging, still suffers the disadvantage that when employing those ethers which catalyze or promote these reactions, the boron trichloride attacks the ether causing disproportionation under certain reaction conditions. Therefore, despite the finding of a more suitable system for reaction with the economical boron trichloride compound, the advantages thereby produced are diminished considerably by the fact that the ethers required are disproportionated and wasted.

It is therefore highly desirable to the industry to overcome this particular problem thus permitting the complete realization of the more economical and beneficial use of boron trichloride in its aforementioned uses and other uses. Accordingly, it is an object of this invention to provide stabilized compositions of boron trichloride in ether solutions. Another object is to provide the stabilization of systems wherein boron trichloride is in contact with ethers which it normally attacks. A still further object of this invention is to provide a method for inhibiting the reactivity of boron trichloride toward ethers which it normally disproportionates. These and other objects of this invention will be apparent as the discussion proceeds.

The novel compositions of this invention comprise boron trichloride, a boron ester and an ether which is normally reactive with boron trichloride. Systems which contain boron trichloride and an ether which is normally reactive with boron trichloride containing a boron ester inhibit or obviate disproportionation or cleavage of the ether in contact with the boron trichloride. The boron esters which are employed in the novel compositions are many and varied. However, the alkyl borates containing up to about 8 carbon atoms in each alcohol residue are especially preferred. Of the ethers which are normally reactive with boron trichloride, tetrahydrofuran and the polyethers, especially the dimethyl and diethyl ethers of diethylene glycol, and methyl ethyl ether of diethylene glycol are particularly important to inhibit since the systems containing boron trichloride and these ethers are the most reactive as for example in the reaction of boron trichloride with sodium borohydride.

The boron esters can be present in the mixture in varying amounts since even minor amounts inhibit to a significant extent the reactivity of the boron trichloride with the ether. However, for best results it is preferred to employ between about 1.5 to 2.5 moles of the boron ester per mole of the boron trichloride. Likewise whether the ether be present in minor amounts or major amounts is not critical since the inhibition of the reaction of boron trichloride therewith is independent of such amounts. Thus, a particularly preferred composition of this invention is that of boron trichloride in admixture with an ether especially tetrahydrofuran, the dimethyl and diethyl ethers of diethylene glycol, or methyl ethyl ether of diethylene glycol and between about 1.5 to 2.5 moles of an alkyl borate containing from 1 to 8 carbon atoms in each alkyl group per mole of boron trichloride.

Another embodiment of this invention is the method whereby the reactivity of boron trichloride with ethers which are normally reactive with boron trichloride is inhibited by bringing these materials into contact in the presence of a boron ester. The method is generally applicable under all conditions in which a boron trichloride is brought into contact with an ether which is normally reactive with boron trichloride regardless of temperature, pressure, mode of addition or other materials present.

The present invention is of particular advantage in that it overcomes the problems described above experienced in previous use of boron trichloride in contact with ethers. Higher yields based on the boron trichloride can be obtained in those reactions wherein it is employed particularly when reacted with an alkali metal borohydride such as sodium borohydride and alkali metal hydrides such as sodium hydride. Likewise, these processes in addition to being performed in higher yield are more economical in eliminating the loss of the ethers which have been found to be of greatest advantage in promoting the reactions of boron trichloride.

As pointed out above the boron esters are employed in the compositions of this invention and in the method of inhibiting reactivity of boron trichloride with ethers normally reactive therewith. In general, any boron ester is applicable in the process; that is any boron compound in which the unit $$\diagdown_{\diagup}\!\!BOR$$

is present, wherein R is an organic radical, preferably hydrocarbon, which can, however, be further substituted with substituents which are essentially inert in the composition and its uses. The boron esters, however, should exhibit some solubility in the system in which they are employed or be liquid. Thus among the boron esters which are employable are included dimethoxy boron chloride, trimethyl borate, triethyl borate, trioctyl borate, diethoxy boron fluoride, triphenyl borate, tricyclohexyl borate, triallyl borate, trinaphthyl borate, tripropargyl borate, methyl diethyl borate and the like. It is preferable to employ boron esters wherein all of the valences of boron are satisfied by alcohol residues. Thus, such materials will have the formula $B(OR)_3$ wherein R has the meaning defined hereinbefore. For best results it is preferred to employ the alkyl borates in which the alkyl groups contain from 1 to about 8 carbon atoms and preferably in which each alkyl group is the same. Especially preferred boron esters, because of their greater availability, economy and applicability in the compositions of this invention, are trimethyl borate, triethyl borate and triphenyl borate.

The compositions also comprise those ethers which are normally reactive with boron trichloride. The ethers which can be employed in the compositions or the method of this invention include the non-aromatic, aromatic and the polyethers. The non-aromatic ethers include the monoaliphatic and mixed ethers. Typical examples of the monoaliphatic ethers included are di-n-butyl ether; di-sec-butyl ether; diisobutyl ether; di-n-amyl ether; di-n-heptyl ether; tetrahydrofuran; and the like saturated and unsaturated ethers. Examples of the mixed ethers which are employed are n-amylmethyl ether; sec-amylethyl ether; n-butyl-isopropyl ether; ethylisoamyl ether; n-butyl-n-propyl ether; and the like. The aromatic ethers include, for example, the monoaromatic ethers, alkyl aryl ethers, and the alkaryl alkyl ethers. Typical examples of the monoaromatic ethers include dibenzyl ether; diphenyl ether; dinaphthyl ether; and the like. When the aromatic ether is an alkyl aryl ether, we employ, for example, methylphenyl ether; methyl-o, m, or p-tolyl ether; methyl-α-naphthyl ether; ethylphenyl ether; ethyl-o, m, or p-tolyl ether; ethyl-α-naphthyl ether; phenyl-n-propyl ether; isopropylphenyl ether; n-butylphenyl ether; n-butyl-o-tolyl ether; isoamyl-n-naphthyl ether; and the like. The alkaryl alkyl ethers which we employ can be, for exampe, benzylmethyl ether; benzylethyl ether; benzyl-n-butyl ether; and the like. Examples of the polyethers which are employed are those having the configuration R—O—(CH$_2$)$_n$—O—R wherein R is an organic radical, preferably hydrocarbon or ether radicals, and $n$ is a small whole number as between about 1 to 10, preferably 1 to 3 inclusive. For example, such polyethers include ethylene glycol ethyl methyl ether; the diethyl ether of ethylene glycol; methyl-n-propyl ether of ethylene glycol; 1,4-dioxane; tetraethylene glycol dimethyl ether; glycerol trimethyl ether; dimethyl ether of diethylene glycol; dimethoxyethane; diethyl ether of diethylene glycol; and the like. Other polyethers which can be employed include, for example, pyrocatechol dimethyl ether; resorcinol dimethyl ether; 1,2,4 - trimethoxybenzene, and the like. Typical examples of ethers which are solid but can be employed by virtue of their solubility in particular reaction mixtures include ethers such as didodecyl ether, hexadecyl ether, octadecyleicosyl ether, ditetracosyl ether, o-diethoxy benzene, trimethylene glycol diphenyl ether, 4-methoxy biphenyl and the like.

The foregoing are merely typical examples of the ethers which can be employed in the process of this invention. Because of greater availability and easier handling, the liquid ethers are preferably employed. In this connection, tetrahydrofuran and the polyethers are especially preferred since the compositions thereof so-produced have greater utility in chemical reactions. Of such polyethers, the dimethyl and diethyl ether of diethylene glycol, tetrahydrofuran, and methyl ethyl ether of diethylene glycol are particularly preferred. It is to be understood that mixtures of the various ethers discussed previously can be employed, for example, a mixture of the diethyl ether and the dimethyl ether of diethylene glycol. Likewise, it has been found that economies can be effected while still obtaining the benefits of the ethers by their employment in admixture with other solvents or suspending media, for example, the hydrocarbons which are particularly preferred. Typical examples of such hydrocarbons are the liquid hydrocarbons such as the nonanes, octadecanes, hexanes, toluene, benzene, xylene, and mixed hydrocarbons such as gasoline, diesel oil and the like petroleum fractions.

The proportions of the various constituents in the compositions of this invention can be varied. The amount of the boron ester is conveniently based upon the boron trichloride. In all compositions, or in processes wherein boron trichloride is to be in contact or in admixture with an ether, some inhibition of the reactivity of the boron trichloride with the ether is experienced when a minor amount as about 0.01 mole of the boron ester per mole of the boron trichloride is employed. On the other hand, amounts as high as 4 moles and higher of the boron ester per mole of the boron trichloride can be employed even though usually not required. In a preferred operation between about 1.5 to 2.5 moles of the boron ester per mole of the boron trichloride are employed. Using amounts greater than that specified is not deleterious so long as the boron ester is generally inert in the reactions in which the composition is employed, and thus can be recovered with the ether, and the mixture of the two reused. Amounts less than about 1.5 moles of boron ester per mole of boron trichloride are less desirable since inhibition of reactivity of the boron trichloride with the ether is diminished. In other words, as the amount of boron ester is decreased below 2 moles thereof per mole of the boron trichloride the inhibition of the reactivity of the boron trichloride with the ether appears to decrease. The amount of ether in the composition is not critical since when the aforementioned proportions of the boron ester are employed the ether will not react appreciably with the boron trichloride. Thus, compositions in which minor amounts of ether as for example 0.01 mole per mole of the boron trichloride are employed up to as high as 100 moles of the ether per mole of boron trichloride employed are contemplated and such compositions which contain other materials. The compositions which are particularly preferred are those in which between about 0.5 to 10 moles of ether per mole of the boron trichloride are employed.

The compositions of this invention and the method whereby they are employed will be more fully understood from the following examples wherein all parts are by weight.

*Example 1*

The following procedure was employed to determine the reactivity of boron trichloride with the ethers. A dried reaction tube was provided in which a small ampoule of water was introduced along with a weighed sample of ether and the reaction tube was placed under vacuum and degassed. A fixed amount of boron trichloride as a gas was introduced into the tube which was then sealed. After an appropriate time the ampoule of water was broken by shaking the tube. The tube was then opened and the amount of ether reacted was determined. The results obtained when employing this procedure with various ethers and mixtures is presented in the following table.

| Ether | Mmoles ether | Mmoles BCl$_3$ | Temp., ° C. | Time, hrs. | Amount of ether reacted, Percent |
| --- | --- | --- | --- | --- | --- |
| 1. Tetrahydrofuran | 28.84 | 2.46 | 24 | 24 | 93 |
| 2. Diethylether of ethylene glycol | 47.2 | 2.58 | 24 | 24 | 57 |
| 3. Dimethylether of diethylene glycol | 53.6 | 2.46 | 24 | 6 | 57 |
| 4. Dimethylether of diethylene glycol | 53.6 | 2.46 | 24 | 12 | 67 |
| 5. Dimethylether of diethylene glycol | 53.6 | 2.46 | 24 | 24 | 73 |
| 6. Dimethylether of diethylene glycol | 53.6 | 1.99 | 0 | 23 | 63 |
| 7. Diethylether of diethylene glycol | 64.8 | 2.24 | 24 | 24 | 27 |
| 8. Dimethylether of diethylene glycol-ethyl ether | (a) | 1.01 | 24 | 24 | 47 |
| 9. Dimethylether of diethylene glycol-tetrahydropyran | (a) | 1.52 | 24 | 24 | 28 | a Mixture of 25 parts each of the two ethers.

It was found that the solutions evolved the corresponding organochloride where reaction occurred. For example, with the dimethyl ether of diethylene glycol, methyl chloride was evolved. It is to be noted that with most ethers a reaction of the boron trichloride with the ether greater than 50 percent is obtained. This is particularly true in the case of the more useful ethers such as the dimethyl and diethyl ethers of diethylene glycol and tetrahydrofuran which have been found to be most effective in catalyzing the reaction of boron trichloride in many of its uses.

*Example II*

To demonstrate and contrast the above results with the compositions and method of this invention, in a reactor in which was placed 2.49 parts of methyl borate and 47.25 parts of the dimethyl ether of diethylene glycol was added 1.41 parts of boron trichloride. The mole ratio of methyl borate to boron trichloride was 2 to 1. No methyl chloride was evolved from the solution over a period of 2 hours at room temperature. Thus, the inhibition of reactivity of boron trichloride with those ethers with which it is normally reactive is demonstrated.

*Example III*

Employing the procedure of Example II, 1100 parts of the diethyl ether of diethylene glycol containing 365 parts of triethylborate are added to 117 parts of boron trichloride. The mole ratio of triethylborate to boron trichloride is 2.5 to 1. Upon standing for 24 hours at 24° C. essentially no reaction is evident.

*Example IV*

To a solution of 100 parts of tetrahydrofuran and 43.5 parts of triphenyl borate is added 23.4 parts of boron trichloride at 25° C. and this temperature maintained for 24 hours under pressure and with agitation. The mole ratio of triphenyl borate to boron trichloride is 1.5 to 1. Essentially no reaction is evident.

*Example V*

To mixture of 25 parts of the dimethyl ether of diethylene glycol and 25 parts of tetrahydropyran containing 3.55 parts of diethoxy boron chloride is added 1.5 parts of boron trichloride at 24° C. At the end of 24 hours essentially no disproportionation of the mixtures of ethers is detected. Contrasting this to the run 9 in the above table it can be seen that a 28 percent loss of the ether is saved.

*Example VI*

When boron trichloride in admixture with tricyclohexyl borate in the mole ratio of 1 to 2.1 are added to 20 moles of the ethyl methyl ether of diethylene glycol and maintained at 50° C. for 24 hours, under pressure with agitation, essentially no reaction of the boron trichloride with the ether is obtained.

*Example VII*

When Example II is repeated substituting n-butyl ether for the dimethyl ether of diethylene glycol, no reaction is obtained.

*Example VIII*

Substituting anisole for the diethyl ether of diethylene glycol in Example III, no reaction of the boron trichloride with the anisole is exhibited upon standing for 24 hours at 30° C.

*Example IX*

When 1 mole of boron trichloride is added to a solution of 2 moles of tributyl borate in 60 moles of diphenyl ether and maintained at 100° C. for 10 hours, under pressure, essentially no reaction of the boron trichloride with the diphenyl ether is exhibited.

The above examples are presented by way of illustration and are not intended to in any way limit the present invention. When the boron esters and ethers normally reactive with boron trichloride described hereinbefore are substituted in the above examples similar results are obtained.

The following example will demonstrate an effective use of the compositions and further application of the method of this invention.

*Example X*

The solution prepared in Example II was placed in a reactor and 1.36 parts of sodium borohydride dissolved in 47.25 parts of the dimethyl ether of diethylene glycol were added thereto at room temperature. Diborane was immediately evolved and a total of 50.3 milliliters was obtained representing a yield of 93 percent. Upon filtering the sodium chloride by-product, the dimethyl ether of diethylene glycol solution, containing methyl borate, is recovered in high yield.

Having thus described the compositions and the method of inhibiting reaction of boron trichloride with ethers, it is not intended that it be limited except as set forth in the following claims.

We claim:

1. As a new composition of matter, a mixture consisting essentially of boron trichloride, a hydrocarbon ether normally reactive therewith, and a boron ester selected from the group consisting of trihydrocarbon boron ester and hydrocarbon oxyboron halide wherein the hydrocarbon groups thereof contain up to and including about 10 carbon atoms.

2. The composition of claim 1 wherein said boron ester is a trialkylborate.

3. The composition of claim 2 wherein said ether is tetrahydrofuran.

4. The composition of claim 2 wherein said ether is the methyl ethyl ether of diethylene glycol.

5. As a new composition of matter, a mixture of boron trichloride, the dimethyl ether of diethylene glycol, and trimethyl borate wherein between about 1.5 to 2.5 moles of said trimethyl borate are present per mole of boron trichloride.

6. The method for inhibiting the reaction of boron trichloride with the dimethyl ether of diethylene glycol which comprises adding between about 1.5 to 2.5 moles of trimethyl borate to said dimethyl ether of diethylene glycol prior to contact of the latter with boron trichloride.

7. The method for inhibiting the reaction of boron trichloride with hydrocarbon ethers normally reactive therewith which comprises bringing said boron trichloride and said ether into contact in the presence of a boron ester selected from the group consisting of a trihydrocarbon boron ester and a hydrocarbon oxyboron halide wherein the hydrocarbon groups therein contain up to and including about 10 carbon atoms.

8. The method of claim 7 wherein said boron ester is a trialkylborate.

9. The method of claim 8 wherein said ether is tetrahydrofuran.

10. The method of claim 8 wherein said ether is the methyl ethyl ether of diethylene glycol.

References Cited in the file of this patent

The Van Nostrand Chemist's Dictionary, D. Van Nostrand Co., Inc., New York, 1953, page 17. (Copy in Div. 46.)

Edwards et al.: Chemical Society Journal (London), pp. 377–81 (1957). (Copy in Scientific Library and 260/462.)